United States Patent [19]

Visser

[11] Patent Number: 4,837,971

[45] Date of Patent: Jun. 13, 1989

[54] APPARATUS OR GREENHOUSE FOR GROWING OF PLANTS

[75] Inventor: Anthony Visser, 's-Gravendeel, Netherlands

[73] Assignee: 501 Visser 'S-Gravendeel Holding B.V., Netherlands

[21] Appl. No.: 58,323

[22] Filed: Jun. 4, 1987

[30] Foreign Application Priority Data

Jun. 13, 1986 [NL] Netherlands ............... 8601534

[51] Int. Cl.$^4$ ............................................. A01G 9/00
[52] U.S. Cl. .................................................... 47/17
[58] Field of Search ............. 47/1.1, 17, 18; 108/17, 108/51.1, 53.3, 91; 105/7, 463.1

[56] References Cited

U.S. PATENT DOCUMENTS

| 844,111 | 2/1907 | Von Fircks | 105/7 |
|---|---|---|---|
| 1,022,616 | 4/1912 | Winandy | 47/18 |
| 1,753,980 | 4/1930 | Baumgartner | 47/17 |
| 4,514,929 | 5/1985 | Lestraden | 47/17 |

Primary Examiner—Robert A. Hafer
Assistant Examiner—Lynda M. Cofsky
Attorney, Agent, or Firm—John P. Snyder

[57] ABSTRACT

An apparatus or greenhouse is shown, which comprises both a treatment area and growing areas. Normally the plants are kept in the growing areas. When the plants have to be treated they are conveyed to the treatment area, in which area treatment equipment (like sprinklers, elements for applying pesticides) is fitted. Also transport means for supplying and removing plants extend only into the treatment area.

According to a preferred embodiment the treatment area is longitudinal and the growing area's are located on both sides of said treatment area. The conveying means are tables moveable along paths extending perpendicular to the length of the treatment area. Two tables are moveable along each paths, an upper table resting on an outer pair of rails and a lower table resting on an inner pair of rails. The containers with the plants therein are placed on the tables.

10 Claims, 3 Drawing Sheets

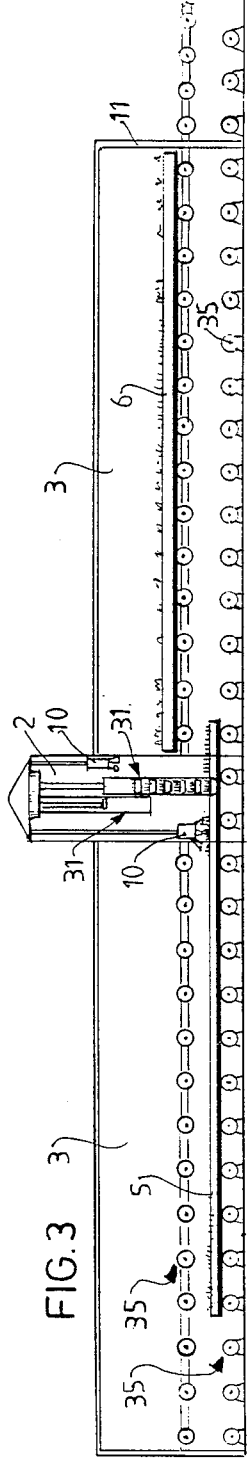
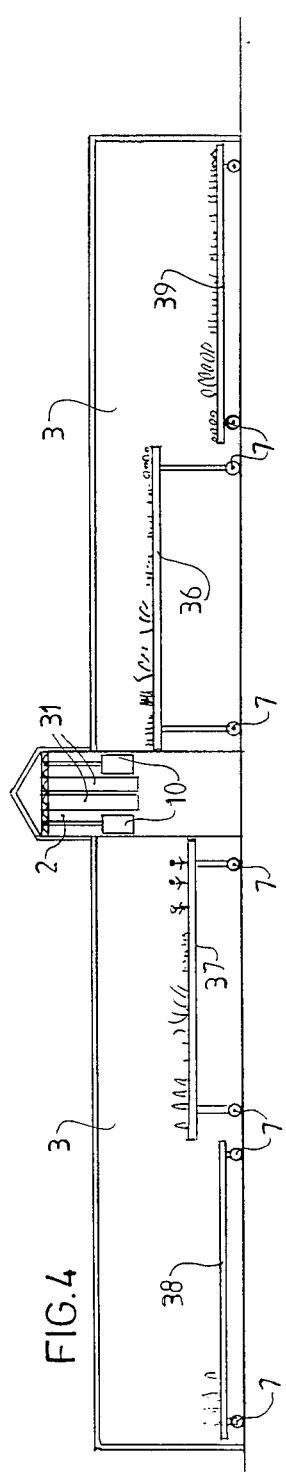
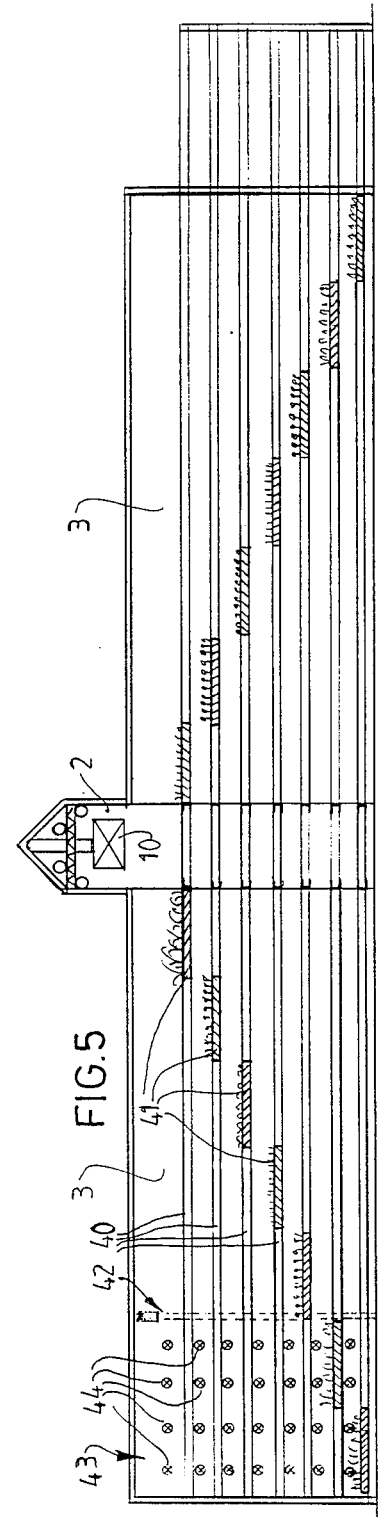
FIG.3
FIG.4
FIG.5

APPARATUS OR GREENHOUSE FOR GROWING OF PLANTS

The present application relates to an apparatus or greenhouse for growing of plants, comprising growing areas wherein containers for growing material are located, at least one treatment area, and means for conveying the containers to and from the processing area.

Such an apparatus is known from the specification U.S. Pat. No. 4,352,256.

According to this known apparatus or greenhouse no means for treating the plants are provided in the treatment area. The equipment for treating the plant extend over the whole growing area because all plants in the growing area have to be reached. As the equipment covers such an extended area it is costly and the chances for defects are relatively great.

In the treatment area the plants are only treated by human labour; there are no special means for mechanical treatment of the plants located in said area.

The aim of the present invention is to provide an apparatus, wherein the treatment equipment does not have to extend over the whole growing area, wherein the conveying means for supply and removal of plants does not extend over the whole growing area either, and wherein the whole process including the treatment and the conveyance can be automatically controlled.

According to the present invention this aim is reached in that means for treatment are provided in the working area.

Thus the treatment equipment only has to extend over the treatment area, which greatly reduces the costs of said treatment equipment. The same counts for the equipment for conveyance of the plants.

Subsequently the present invention will be illucidated referring to the accompanying drawings, wherein:

FIG. 3 shows a schematic sectional view of a second embodiment of the present invention;

FIG. 4 shows a schematic cross-sectional view of a third embodiment of the present application; and FIG. 5 shows a schematic cross-sectional view of a fourth embodiment of the present invention.

Figure 1:
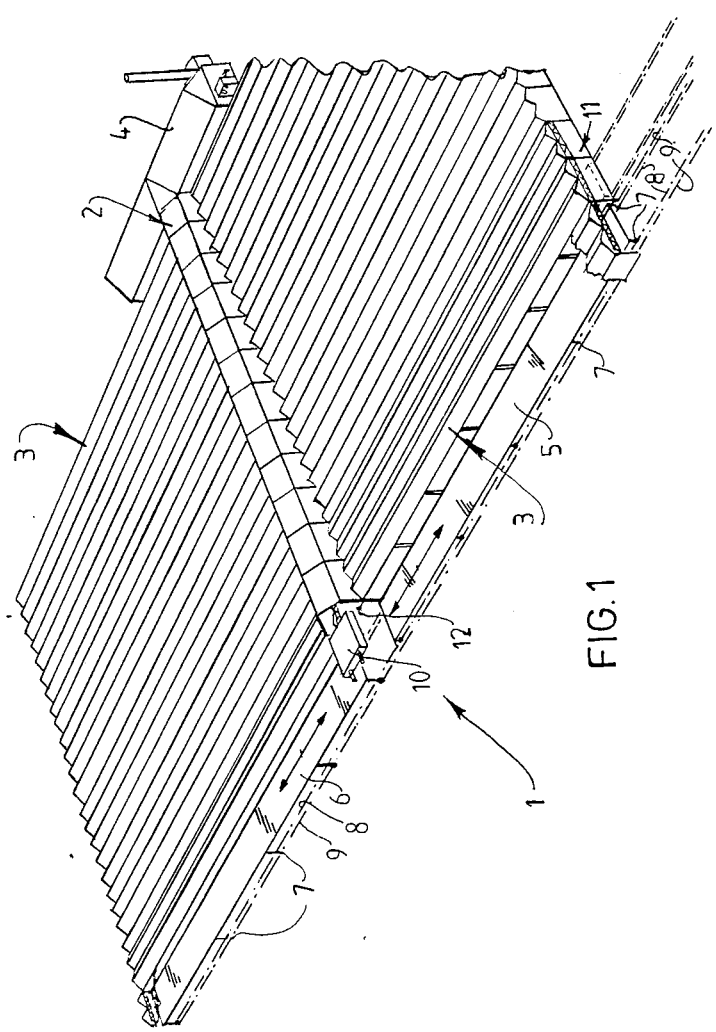
FIG. 1 shows a partially broken away perspective view of a greenhouse complex embodying an apparatus according to the present invention.

FIG. 1 shows a block of greenhouses 1 comprising a central treatment area 2 and two growing areas 3 located on both sides thereof. A conveyance- and control room 4 has been located adjacent to the central treatment area 2.

In each growing area moveable tables 5, 6 are provided on which the plants contained into containers have been placed. The lengths of the tables 5, 6 are equal to the width of the growing areas. Each leg of the table 5 comprises a wheel 7, which rests on a pair of rails 8. The pair of rails extends over the whole width of both growing areas including the central treatment area 2, so that the table 5 can be moved both into the left growing area and into the right growing area. Each leg of the other moveable table 6 each comprises a wheel 7, which rests on a pair of outer rails 9, so that the table 6 can be moved over the whole width of both growing areas including the central treatment area as well. To avoid obstructing each other the table 5 is on a lower level than table 6, and the pair of rails 8, on which table 5 rests has been located inside the pair of rails 9, on which table 6 rests. Thus table 6 can be placed over table 5 like a gantry.

In the same way as just described the whole area of both growing areas has been covered by tables which are moveable over pairs of rails 8, 9. When the apparatus is in its neutral position the whole green house area is covered with tables, such as to expose to the sunlight all containers located on the tables.

In the central treatment area 2 a level of each double pair of rails 8, 9 a central treatment apparatus 10 has been provided. This central treatment area can treat the plants being present in the treatment area, like sprinkling, plunging, supplying of fertilizer or pesticides. Every chosen part of the table 5, 6 and so every chosen group of plants chosen can be positioned under the central treatment apparatus 10 as the tables 5, 6 are moveable such as to treat every chosen group of plants. The tables 5, 6 can not obstruct themselves during moving and during the treatment as they are on different levels.

For some plants it is advisable that during a period of time they are located outside the greenhouse for the so called seasoning. The apparatus according to the present invention provides in the execution of this treatment by the provision of removeable frontwalls 11 in the growing areas 3 and by extending the pairs of rails 8, 9 to the outside of the greenhouse. By these measures the plants can be moved outward such as to season them.

To supply fresh growing material a conveyor 12 is provided in the central treatment area 2, for conveying the containers from the transport- and control area 4 to each chosen table 5 or 6. Of course this conveyor serves for the removal of the finished product too.

Figure 2:
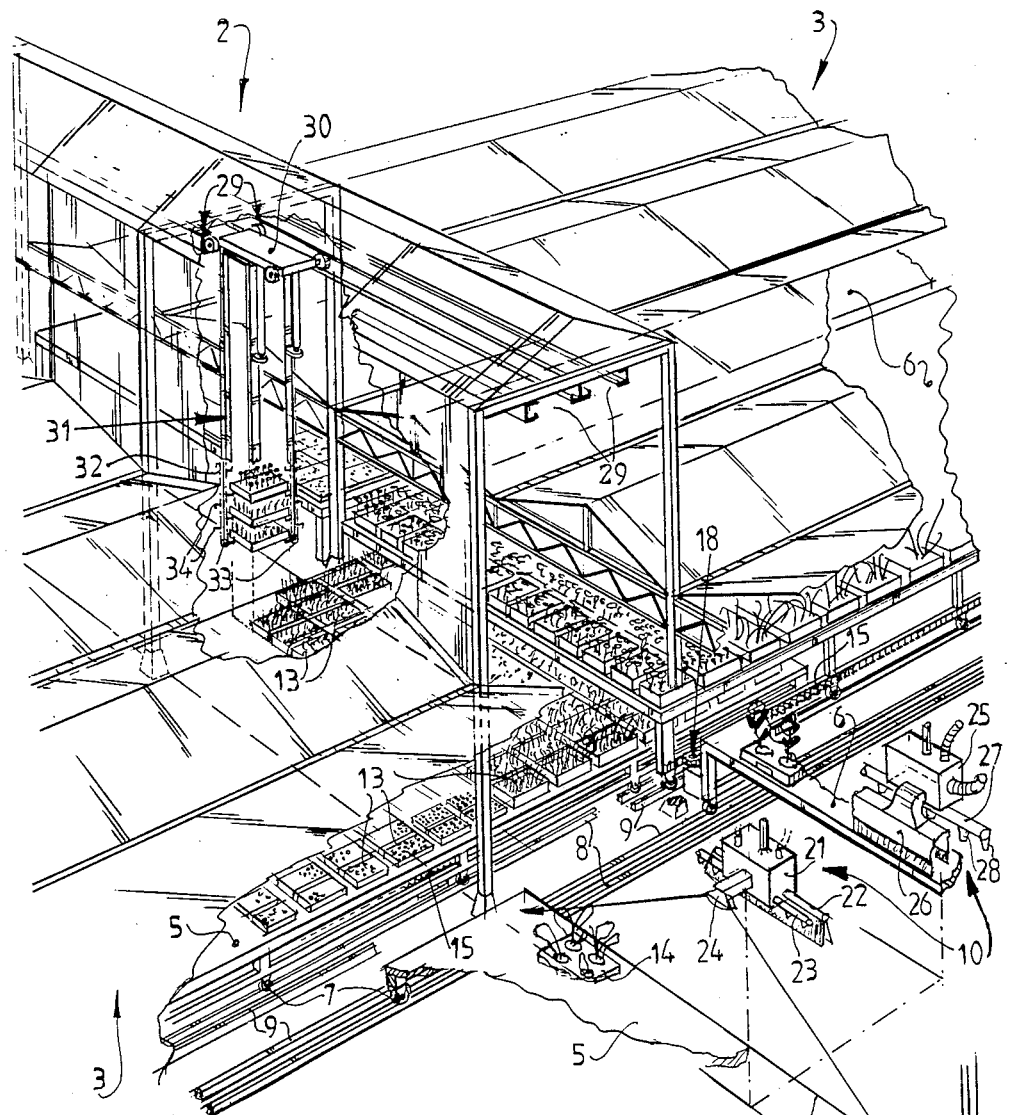
FIG. 2 shows a partially broken away perspective view of a detail of a first embodiment of the present invention.

FIG. 2 shows a detail of the central treatment area 2 and the adjacent growing areas 3.

The plants 14 are located in suitable containers 13 on the table 5, which is moveable over the pair of rails 8. On one side of the table 5 a rack 15 is provided, which rack engages a pinion 18, which is driven by an electric motor 17 through a gearbox 16. The rack 15 contains on its flat side a distribution of stripes 19, which can be detected by a detection apparatus 20. The position of the table 5 can be determined precisely by the combination of the detector and the distribution of stripes. The electric motor 17 is controlled by a central control unit 21, to which the detector 20 is connected as well. By the combination of the automatic control unit the detector 20 and the electric motor 17 the table 5 can be moved to every chosen location on the pair of rails. As appears from the drawing the drive apparatus comprising the electric motor 17, the gearbox 16 and the pinion 18 is positioned under the table.

The table 6 moveable over the same path rests on a pair of outer rails 9 through wheels 7. The table 6 comprises a drive apparatus, comprising a rack 15, an electric motor 17, a gearbox 16 and a pinion 18. Of course this drive apparatus is located on the outside of the outer pair of rails 9, such as to avoid obstruction of the lower table 5 by the upper table 6. The moveable table 6 comprises a distribution of stripes 19 located on a suited spot, while a detector 20 has been provided in accordance therewith.

According to a preferred embodiment not shown in the drawings the rails are constituted by heating pipes. This measure saves material, while the transmission of heat takes place in the most efficient location, i.e. under the plants.

When a group of plates located on a table 5, 6 has to be treated, for instance has to be sprinkled or has to be treated with a pesticide, the group of plants 14 concerned is moved under the central treatment unit 10 belonging to the pair of rails concerned. This treatment unit 10 takes the shape of a unit 21, which comprises a pipe 22 which has been equipped with nozzles for the sprinkling of the plants being under the pipe. As such an apparatus has only a narrow treatment area generally the table has to be moved under the pipe 22 during sprinkling. The unit 21 further contains another pipe 23 fitted with nozzles for applying liquid pesticides. Further the central treatment unit 10 comprises a nozzle 24 for spraying pulverized pesticides. This nozzle 24 has a shape such as to distribute the sprayed pulver over the whole width of the table. Further the central treatment unit comprises a second unit 25 which comprises a nozzle 26 to supply gaseous pesticides. Further the unit 25 comprises a pipe 27, to which big size nozzles 28 are fitted for sprinkling with drops of greater size.

According to this embodiment a central treatment unit 10 has been provided for every pair of rails 8, 9 and thus for every pair of tables 5, 6. Thus it is possible to simultaneously treat plants located on different pairs of tables. In another embodiment, only one central control unit 10 is required, movable longitudinally along the central treatment area. in this embodiment only one table may be treated at a time. It is of course also possible to divide the treatment unit 10 into elements which have to be used often, like the sprinkle unit and into elements which have to be used less often, like the apparatuses for supplying pesticides. Then the treatment elements used often are provided for each pair of tables and the treatment units which are used less often are provided only once and then moveably.

According to this embodiment a double crane runway 29 has been provided for supplying and removing the containers with the growing material. A cat 30 is moveable along this crane runway. A container stacking unit 31 has been fitted to this cat 30, of which unit the height is adjustable to adjust to the two levels of the tables 5, 6. The stacking unit comprises four vertical conveyor belts 32 guided over guiding wheels 33 which are fitted to the corners of a rectangle. The conveyor belts 32 each comprise hooks 34 for the gripping of the containers 13.

FIG. 3 shows a further embodiment of the apparatus according to the present invention, wherein the tables 5, 6 do not comprise wheels, but according to which embodiment these tables can move over a great number of stationary, but rotatably fixed rollers 35, of which a limited number is driven. These rollers are fitted into two rows located one above the other, wherein the rollers 35 extend till outside the growing areas 3 to move the tables 5, 6 outside the greenhouse for the seasoning of the plants. To provide therein the frontwall 11 is made removeable It is also possible to use pairs of wheels at opposite sides of each table instead of the rollers 35, such wheels being spaced apart along the length of a table by about the same spacing as is shown for the rollers 35.

FIG. 4 shows another embodiment of the present invention, wherein the tables 36, 37, 38, 39 only extend over half of the width of the relevant growing area 3. This embodiment has the advantage that the tables have smaller sizes and that they can be driven more easily and with a limited power.

For the moving of these four tables 36, 37, 38, 39 only three different levels are necessary. Of course three pairs of rails located within each other have to be provided according to the embodiment and the tables are located above each other like gantries.

According to the embodiment shown in FIG. 5 sliding paths 40 are provided wherein adapted containers 41 are moveable. The containers 41 are driven by chains or belts not depicted in the drawings. In the drawing the location of the containers is shown as being in the neutral position. In the central processing area 2 gliding paths 40 are provided extending in the longitudinal direction of the central processing area for supplying and removing the containers. Also the driving in this direction takes place by chains or belts.

To save heating costs the containers 41 can all be located in a part 43 of the growing area 3 which can be isolated by a removable isolating wall 42. In the cold season this is advantageous as then only said part 43 has to be heated. It will be clear that in this situation only the plants located in the upper containers 41 are exposed to sunlight. To supply a light to the plants which are located in the containers located thereunder lights 44 are provided. According to this embodiment the lights 44 are fitted irremoveably; it is also possible to fit the lights 44 to the undersides of the containers 41 or the tables.

Of course it is in the embodiment described before also possible to insulate a part of the growing area 3 and to place all containers therein during the cold season. This results in a considerable reduction of heating costs. Then also lights can be provided for supplying light to the plants located on the tables underneath. Possibly these lights can be fitted to the underside of the upper tables.

It is also possible not to provide the complete greenhouse complex with glass walls, as is common, but make it completely closed for light. Of course an apparatus for supplying artificial light has to be provided, but the thermal losses will be limited considerably.

Because in the apparatus according to the present invention the plants are conveyed to the treatment area 2 for undergoing treatment the growing areas do not have to be accessible and thus can be made lower than the height of a man. This gives considerable savings in building costs.

I claim:

1. A greenhouse comprising the combination of a first greenhouse growing area having a longitudinal length and a transverse width, a second greenhouse growing area similar in transverse width to the first growing area and having a longitudinal length, the longitudinal lengths of the growing areas extending in line with each other and being separated by a relatively narrow space, a treatment area in said relatively narrow space and having a width defined by said relatively narrow space and having a length substantially greater than its width, first support means having a width substantially equal to said transverse width for supporting containers containing plants, first guide means for guiding said first support means along a first path extending longitudinally through the lengths of both growing areas and bridging therebetween through the width of the treatment area, second support means having a width substantially equal to said transverse width for supporting containers containing plants, second guide means for guiding said second support means along a second path extending longitudinally through the lengths of both growing areas and bridging therebetween through the width of the treatment area, the first and second paths being of different heights so that the first and second support means may be disposed at any position along their respective paths without interference between each other, drive means for separately driving the first and second support means along their respective paths, and treatment means within said treatment area and above said paths for treating plants positioned along one or the other of the paths in bridging relation to the treatment area.

2. A greenhouse as defined in claim 1 wherein the first and second support means are each of a length substantially equal to the longitudinal length of a respective growing area.

3. A greenhouse as defined in claim 2 wherein the longitudinal lengths of the growing areas are substantially equal.

4. A greenhouse as defined in claim 1 wherein the first and second support means are each of a length substantially less than the longitudinal length of a growing area so that either one or both of the support means may be positioned in either growing area and also in overlying relation to each other.

5. A greenhouse comprising the combination of a first greenhouse growing area having a longitudinal length and a transverse width composed of a plurality of substantially equal width spans, a second greenhouse growing area similar in transverse width to the first growing area and having a longitudinal length, the longitudinal lengths of the growing areas extending in line with each other and being separated by a relatively narrow space, a treatment area in said relatively narrow space and having a width defined by said relatively narrow space and having a length substantially the same as the transverse width of the growing areas, a plurality of first support means each having a width substantially equal to that of a span for supporting containers containing plants, first guide means for guiding said plurality of first support means along first parallel paths extending longitudinally through the lengths of both growing areas and bridging therebetween through the width of the treatment area, a plurality of second support means each having a width substantially equal to that of a span for supporting containers containing plants, second guide means for guiding said plurality of second support means along parallel second paths extending longitudinally through the lengths of both growing areas and bridging therebetween through the width of the treatment area, the first and second paths being of different heights so that the first and second support means may be disposed at any position along their respective paths without interference between each other, drive means for separately driving the first and second support means along their respective paths, and treatment means within said treatment area and above said paths for treating plants positioned along one or the other of the paths in bridging relation to the treatment area.

6. A greenhouse as defined in claim 5 wherein the plurality of first and second support means are each of a length substantially equal to the longitudinal length of a respective growing area.

7. A greenhouse as defined in claim 6 wherein the longitudinal lengths of the growing areas are substantially equal.

8. A greenhouse as defined in claim 5 wherein the plurality of first and second support means are each of a length substantially less than the longitudinal length of a growing area so that any one or all of the support means may be positioned in either growing area and also in overlying relation to each other.

9. A greenhouse construction comprising the combination of spaced end-to-end growing areas and a treatment area interposed between the spaced growing areas, the growing areas each being divided into a plurality of parallel lanes in which the lanes of the growing areas are continuous except for interruptions at the treatment area, the treatment area defining a lane orthogonal to the lanes of the growing areas, at least one support means in each lane of the growing areas for supporting containers for plants, the support means of the growing area being disposed at different heights so that the support means in different lanes of the growing areas may be shuttled back and forth between the growing areas without interfering with each other, and overhead treatment means in the treatment area for treating plants positioned on support means bridging between growing areas.

10. A greenhouse construction as defined in claim 9 including drive means for individually shuttling the support means back and forth along their lanes.

* * * * *